Aug. 15, 1961  J. E. FIELDEN  2,996,647
POSITIONING SERVO-MOTOR MEANS
Filed Feb. 27, 1959

Inventor
J. E. Fielden
By *Harold Downing Peeble* Attys

United States Patent Office 2,996,647
Patented Aug. 15, 1961

2,996,647
POSITIONING SERVO-MOTOR MEANS
John Ernest Fielden, Bowdon, England, assignor to Fielden Electronics Limited, Manchester, England
Filed Feb. 27, 1959, Ser. No. 796,003
Claims priority, application Great Britain Mar. 6, 1958
23 Claims. (Cl. 318—28)

This invention relates to servo-motor means for positioning a movable member in accordance with an input signal.

A known means of this kind comprises two reactances variable in opposite senses with variation of the relative positions of a first reactance element movable in dependence upon the input signal and a second reactance element movable in dependence upon the movement of the movable member, each reactance being connected to a corresponding tuned circuit of a thermionic valve push-pull oscillator such that a change in the displacement between the reactance elements causes the amplitude of oscillation in the tuned circuits and, consequently, the anode currents of the valves to change in opposite senses. The anode currents of the two valves are equal when the reactances are equal. Electromagnetic relay means connected in the anode circuits of the valves are responsive to a predetermined unbalance of the anode currents to actuate sets of contacts selectively depending upon the sense of the unbalance. An electric motor controlled by the relay means is operative to drive the movable member in one direction or the other, according to which set of contacts is actuated, to restore the reactances to equality after a disturbance.

In this known servo-motor means the relay means is responsive only to a predetermined unbalance of the anode currents. The motor thus remains unenergized when the reactances differ by less than a predetermined amount and it becomes fully energized when the reactances differ by more than the predetermined amount. This instantaneous switching from an unenergized to a fully energized condition predisposes the arrangement to hunting.

In other known servo-motor means employing an electric motor as the actuating element hunting is reduced by arranging that the torque developed by the motor increases continuously as the arrangement departs from equilibrium and falls continuously as the arrangement approaches equilibrium. So far as the applicant is aware, the only known means of achieving this result is to employ a two phase alternating current motor having one phase energized at a constant level and the other phase energized at a level which increases continuously as the arrangement departs from equilibrium and in a phase appropriate to cause the motor to drive in a direction to restore the arrangement to equilibrium after a change in the input signal. In practice, however, it is difficult to ensure that the energizations of the two phases are always in precisely the desired phase relationship to each other.

One object of the invention is to provide an improved servo-motor means for positioning a movable member in accordance with an input signal which has an inherent tendency not to hunt and in which phasing difficulties do not arise.

So far as the applicants are aware, in all known servo-motor means employing an electric motor for accurately positioning a movable member in accordance with an input signal the motor is operatively connected to the movable member via a toothed gear train. The two main reasons for adopting this form of drive are, firstly, that a large mechanical advantage can be obtained and, secondly, lost motion between the motor and the movable member can be eliminated. A toothed gear train is, however, expensive to manufacture because the gears require accurate machining and the shafts upon which the gears are supported require to be accurately positioned relatively to each other.

A further object of the invention is, accordingly, to provide a servo-motor means employing an electric motor in which a toothed gear drive between the electric motor and the movable member is eliminated.

According to the invention a servo-motor means for positioning a movable member in accordance with an input signal comprises a reactance dependent upon the displacement between a first and a second reactance element, means for varying said displacement in dependence upon said input signal and the position of said movable member, said reactance being connected to the oscillatory circuit of an electronic oscillator and controlling the amplitude of oscillation thereof, rectifier means having its input circuit coupled to said oscillatory circuit and providing at its output terminals a unidirectional current dependent upon said amplitude of oscillation, circuit means connecting said output terminals to the armature of a direct current motor operatively coupled to said movable member, said circuit means including a first resistance said first resistance being supplied with a current dependent upon said unidirectional current having one end connected to one end of said armature and the arrangement being such that the current in said armature varies gradually from a maximum in one direction to a maximum in the reverse direction as the amplitude of oscillation changes gradually from zero to maximum and vice versa and the resultant rotation of said armature is such that said reactance is substantially restored to a predetermined value after a change in said input signal.

Embodiments of the invention, suitable for recording an electrical input signal, will now be described, by way of example, with reference to the accompanying drawings, of which:

In these figures corresponding circuit elements are indicated by the same reference numeral.

Figure 1:
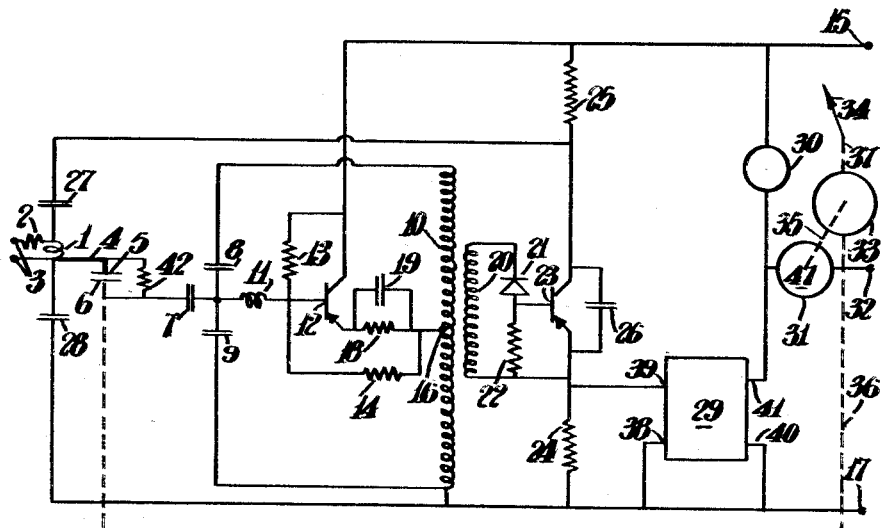
FIGURE 1 is a partly schematic circuit diagram of one embodiment.
Figure 2:
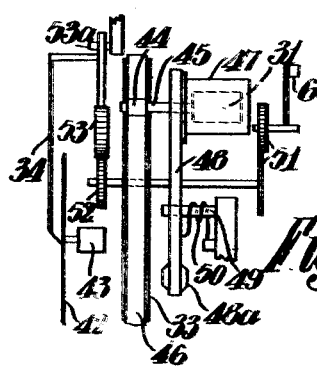
FIGURE 2 shows certain mechanical details of the embodiment of FIGURE 1.

As shown in FIGURES 1 and 2, a coil 1 of a moving coil instrument is connected in series with a resistance 2 across the input terminals 3 to which an input electrical signal is to be applied. The coil 1 carries an arm 4 at the end of which is a condenser plate 5. A second condenser plate 6 is supported by a second arm (not shown) which pivots about the axis of the coil 1. Movement of the coil and the second arm thus permits the plates 5 and 6 respectively to describe concentric arcs of equal radius. The plates 5 and 6 together form a capacitance the magnitude of which varies with their displacement from each other. The plate 5 is electrically connected via the arm 4 to one side of the coil 1 and the plate 6 is electrically connected through the second arm and a blocking capacitance 7 to the common connection of two capacitances 8 and 9.

The capacitances 8 and 9 together with a tapped inductance 10 form a bridge-connected oscillatory circuit. The common connection between the capacitances 8 and 9 is connected through a stabilising inductance 11 to the base electrode of a transistor 12 of the p-n-p type. The mean potential of this base electrode is maintained at a suitable value in known manner by connecting it to the common connection between two resistances 13 and 14 which together constitute a potential divider connected between the negative terminal 15 of an electrical source and the tapping point 16 on the inductance 10, one end of which is connected to the positive terminal 17 of the electrical source. The collector electrode of the transistor 12 is connected to the negative terminal 15 of the source and the emitter electrode of the transistor 12 is connected to the tapping point 16 through a resistance 18 which is shunted by a capacitance 19. This capacitance 19 ensures that the emitter electrode is effectively connected, so far as high frequency current is concerned, directly to the tapping point 16. The resistance 18 co-operates with the resistance 14 and 13 to stabilise the D.C. working point of the transistor 11 in known manner.

The plates 5 and 6 are connected together through a high resistance 42 in order to prevent unidirectional potentials and, consequently, electrostatic forces being built up between them. In the absence of this resistance 42 the unidirectional potential appearing between the coil 1 and the base electrode of the transistor 12 would be divided between the capacitance 7 and the capacitance between the plates 5 and 6 with the result that an electrostatic force would be set up between the plates 5 and 6.

The side of the coil 1 which is connected to the arm 4 is connected through a capacitance 28 to the terminal 17. The capacitance between the plates 5, 6 is thus connected, so far as high frequency current is concerned, in parallel with the capacitance 9. Variations in the capacitance between these plates and are thus effective to control the amplitude of oscillation of the oscillatory circuit 8, 9 10.

The inductance 10 is inductively coupled to an inductance 20 and the voltage induced in the latter inductance is rectified by the rectifier 21 to produce a direct current in the base-emitter circuit of a transistor 23. A resistor 22 serves as a shunt across the base-emitter junction of transistor 23 and is effective to reduce the collector current to an acceptable minimum when the rectifier 21 is not delivering current. The emitter electrode of transistor 23 is connected through a resistance 24 to the positive terminal 17 and the collector electrode of the transistor 23 is connected through a resistance 25 to the negative terminal 15. A capacitance 26 is connected between the emitter and collector electrodes of the transistor 23. The transistor 23 serves to amplify the current flowing in its base-emitter circuit; the current flowing in its collector-emitter circuit is therefore dependent upon the amplitude of oscillation in the oscillatory circuit.

A current amplifier 29 has its input terminals 38, 39 connected across resistance 24 and its output terminals 40, 41 connected in series with a metal filament lamp 30 between terminals 15 and 17. The armature 31 of a permanent magnet direct current motor 47 is connected between terminal 41 of the amplifier 29 and a terminal 32 the potential of which is between the potentials of terminals 15 and 17. The amplifier 29 provides an output current dependent upon the potential developed across the resistance 24 and thus dependent also upon the amplitude of oscillation of the oscillatory circuit.

The resistance of the metal filament of the lamp 30 is such that, on the one hand, when the amplifier 29 is supplying substantially no current the filament is relatively cold and, consequently, substantially the whole of the potential difference across the terminals 15 and 32 appears across the armature 31 and, on the other hand, when the amplifier 29 is supplying substantially maximum current the filament is hot and consequently, substantially the whole of the potential difference between the terminals 17 and 32 appears across the motor armature 31. The polarity of the potential applied to the motor armature is thus reversible and the armature may consequently be driven in either direction. As the maximum torque developed when the armature is driven in one direction is dependent upon the potential difference across the terminals 15 and 32 and the maximum torque developed when the armature is driven in the reverse direction is dependent upon the potential difference across the terminals 17 and 32, and as it is desirable that the maximum torque shall be the same whatever the direction of rotation, the potential of terminal 32 is arranged to be midway between the potentials of terminals 15 and 17.

In this embodiment the movable member requiring to be positioned is a disc 33 which is required to be positioned in accordance with the input signal applied to the terminal 3. The position of the disc is, furthermore, required to be recorded by a pen arm 34 on a chart 42 (see FIGURE 2) driven by a clock motor 43.

To this end the disc 33 is driven by the motor armature 31 through a friction drive formed by engagement of a sleeve 44 provided on the spindle 45 of the armature 31, with a ring 46 provided on the periphery of the disc 33. Both the sleeve 44 and ring 46 are formed of material having a high coefficient of friction. The motor 47 is mounted, with the spindle 45 of its armature 31 parallel to the axis of rotation of the disc 33, upon an arm 48 mounted upon a pivot 49, the arm being biassed by means of a spring 50 in order to maintain a pressure between the spindle 45 of the armature 31 and the periphery of the disc 33. Preferably, the combination of the motor 47 and the pivoted arm 48 is mechanically balanced by means of a counterweight 48a in order to prevent this steady pressure being disturbed by mechanical shock or vibration. The friction drive between the sleeve 44 and ring 46 is indicated in FIGURE 1 by the broken line 35. The disc 33 is, on the one hand, coupled to the plate 6 through a train of gears 51 having no backlash and, on the other hand, to the pen arm 34 through a backlash free mechanism comprising a pinion 52 and a cooperating toothed sector 53 pivotally mounted upon a pivot 53a. The operative connection between the disc 33 and the plate 6 and that between the disc 33 and the pen arm 34 are indicated in FIGURE 1 by the broken lines 36 and 37 respectively.

Assuming that the signal applied to the terminals 3 changes from a value at which the arrangement is in equilibrium to a new value, the change being of a sufficient magnitude and in an appropriate direction to cause the arrangement to oscillate at an amplitude which is sufficient to ensure that the current flowing in the output circuit of the amplifier 29 in the direction from terminal 40 to terminal 41 is a maximum, terminals 40 and 41 of the amplifier 29 will, in effect, be short circuited and the resistance of the lamp 30 will be high due to the large current flowing through it. Substantially the full potential across the terminals 17 and 32 is, therefore, applied to the armature 31. This armature is, consequently, driven at maximum speed and the arrangement is such that the direction in which the armature is driven is such as to move the plate 6 towards a position in which its displacement from the plate 5 is restored to its original value.

Assuming, now, that the signal applied to the terminals 3 changes in the opposite direction and to an extent sufficient to ensure that the current flowing in the output circuit of the amplifier 29 is a minimum, terminals 40 and 41 of the amplifier 29 will, in effect, be open circuited and the resistance of the lamp 30 will be small due to the small current flowing through it. Substantially the full potential appearing across the terminals 15 and 32 is, therefore, applied to the armature 30 and this armature is, consequently, driven at maximum speed in the opposite direction so that the plate 6 is again moved towards a position in which its displacement from the plate 5 is restored to its original value.

Between these two extremes there is an equilibrium condition in which the displacement between the plates 5, 6 is such that the output current of the amplifier is such that the potential of terminal 41 is equal to that of terminal 32, and the armature 31 is stationary. This condition occurs when the amplitude of oscillation of the oscillatory circuit 8, 9, 10 has a predetermined value.

In operation, therefore, a change in the magnitude of the signal applied to the terminals 3 causes proportional movement of the plate 5 which results in a change in capacitance between the plates 5 and 6. This change in capacitance causes a change in the amplitude of oscillation in the oscillatory circuit 8, 9, 10 and this, in turn, results in a current flowing through the motor, the direction of this current being such as to drive the motor in a direction which restores the displacement and the capacitance between the plates 5 and 6 to their original values and the amplitude of oscillation to its predetermined value. The displacement between the plates 5 and 6 required to cause the amplitude of oscillation to have this predetermined value is the same whatever the position of the plate 5. The plate 6 is, therefore, moved through exactly the same displacement, as a result of a change in the input signal, as is the plate 5. The arrangement thus operates as a servo-loop which automatically restores the displacement between the plates 5, 6 to its original value. Since movements of the discs 33 and pen arm 34 are proportional to the movement of the plate 5 and the movement of the plate 5 is proportional to the change in the magnitude of the signal applied to the terminals 3, the movements of the disc 33 and the pen arm 34 are proportional to the change in the input signal.

By employing a direct current motor and by arranging that the armature current changes gradually from a maximum in one direction to a maximum in the reverse direction as the amplitude of oscillation changes from zero to maximum and vice versa it is arranged that armature current commences to flow immediately the displacement between the reactance elements departs from the predetermined value corresponding to the predetermined amplitude of oscillation at which the current through the armature is zero. Furthermore, the magnitude of the armature current increases continuously as that displacement departs from its predetermined value. Consequently, a restoring torque is developed by the motor immediately the arrangement departs from equilibrium and this torque increases continuously as that arrangement departs further from equilibrium and decreases as the arrangement approaches equilibrium. The arrangement therefore possesses an inherent tendency not to hunt. Furthermore, by employing a direct current motor it is ensured that no phasing difficulties arise such as are encountered when a two phase alternating current motor is employed as the actuating element.

By adopting a friction drive and by supporting the motor on a pivoted arm the present invention, while providing a drive having a large mechanical advantage, eliminates toothed gears between the armature and the movable member and, consequently, reduces cost. The choice of a friction drive in place of a toothed gear drive does not result in any reduction in the accuracy with which the movable member is positioned because the disc 33 moves with the plate 6 or slider 54 and the plate 6 or slider 54 must, after a disturbance, take up a position in which the displacement between the plates 5 and 6 is substantially restored to its predetermined value. The only effect of slip, provided it is not 100%, is to prolong the period required to readjust the arrangement after a change in the input signal.

In order to provide a derivative feedback for the purpose of preventing hunting the common point of the resistance 25 and the collector electrode of the transistor 23 is connected to that side of the coil 1 remote from the terminal 17 through a blocking capacitance 27. Alternatively, the common point of the lamp 30 and terminal 41 may, if there is no phase-shift in amplifier 29, be connected to that side of the coil 1 remote from the terminal 17 through the blocking capacitance 27. A resistance 2 connected in series with the coil 1 across terminals 3 is of a sufficient magnitude to prevent the derivative feedback circuit being substantially short circuited when a low impedance source of input signal is connected to the terminals 3.

Figures 3, 4:
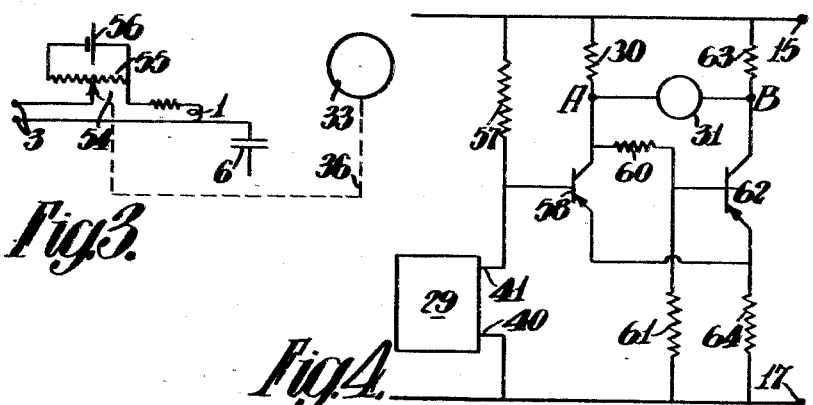
FIGURES 3 and 4 are modifications of different portions of FIGURE 1.

As shown in FIGURE 3, in a modification of the embodiment described above, the plate 6 is stationary and the disc 33 is operatively connected, as indicated by the broken line 36, to the slider 54 of a potential divider 55 supplied with direct current from a constant potential source 56 whereby a potential is injected into the energising circuit of the moving coil 1, the polarity of the source 56 being such that the injected potential is opposed to that applied to the terminals 3 and the arrangement being operative to adjust the injected potential to equality with that applied to the terminals 3.

The lamp 30 may be replaced by any suitable resistance. It may, for example, be a fixed resistance, but the maximum torque developed by the motor will then be reduced due to the larger potential drop occurring across this resistance. This resistor may, alternatively, have a resistance which increases with the current flowing through it.

The maximum torque developed by the motor may be increased by using the modified motor energising circuit of FIGURE 4. In this modification the output terminal 41 of the amplifier 29 is connected to terminal 15 of the source of direct current via a resistance 57 and to the base electrode of a transistor 58 directly. The collector electrode of transistor 58 is connected to the terminal 15 via a resistance 30 and to the terminal 17 via resistances 60 and 61 connected in series. The common connection of resistances 60 and 61 is connected to the base electrode of a transistor 62, the collector electrode of which is connected to terminal 15 via resistance 63 and the emitter electrode of which is connected to the emitter electrode of transistor 58. The motor armature 31 is connected between points A and B which are respectively connected to the collector electrodes of the transistor 58 and 62.

In operation, if it is assumed that the amplifier 29 is providing a minimum output current, the potential of the base electrode of transistor 58 approximates to that of the negative terminal 15 of the source. Transistor 58 therefore conducts and a substantial current flows through the resistance 30. The potential of point A therefore approaches that of the positive terminal 17 with the result that the potential of the base electrode of transistor 62 also approaches that of the positive terminal 17 and the current flowing in the collector circuit of transistor 62 falls to a low value. The potential of point B therefore approaches that of terminal 15. A maximum current thus flows through the armature 31 in the direction from point A to point B. If, on the other hand, it is assumed that the amplifier 29 is providing maximum output current, the potential of the base electrode of transistor 58 approximates to that of the positive terminal 17 with the result that transistor 58 is cut-off. The potential of the point A therefore approaches that of the negative terminal 15 with the result that the potential of the base electrode of transistor 62 also approaches that of the negative terminal 15 and the current flowing in the collector circuit of transistor 62 rises to a high value. The potential of point B therefore approaches that of the terminal 17. A maximum current thus flows through the armature 31 in the direction from point B to point A.

Between these two conditions there is a third condition in which both transistors 58 and 62 conduct and the potential difference between points A and B is zero and the motor armature is, consequently, stationary.

The resistance 64 is of a relatively low value and serves to limit the total current flowing through the transistors 58 and 62. If other circuit components have suitable values the resistance 64 may be omitted.

In the circuit of FIGURE 4 the resistances 30 and 63 may be replaced by the filaments of metal filament lamps.

In the circuit arrangement of FIGURE 4 the maximum potential applied to the armature 31 may conveniently be as high as three quarters of the potential between terminals 15 and 17. This is considerably higher than that attainable by means of the arrangement of FIGURE 1 where the potential applied to the armature 31 is of necessity limited to half the potential between terminals 15 and 17 and it is for this reason that the arrangement of FIGURE 4 permits the motor to develop a higher torque.

The moving coil instrument may be replaced by any other convenient arrangement including a coil in inductive relationship with a magnet and causing, by its movement, a change in a capacitance.

The capacitance formed by the plates 5 and 6 may be replaced by any other convenient variable reactance. It may, for example, be replaced by an inductance the magnitude of which is dependent upon the proximity to it of a conducting vane. In that event, the interconnection between the variable inductance and the oscillatory circuit would be modified in a manner which will be apparent. In a further modification the plate 5 may be arranged for movement in dependence upon a mechanical input signal: it is, however, not then possible to use the derivative feedback circuit described above.

The invention is not limited to the positioning of a movable member by a rotational movement. It may be used, for example, in the longitudinal positioning of a strip-shaped member, the drive from the motor being transmitted to the strip via a strip of friction material fixed to one edge of the strip and the strip being coupled to the variable reactance via a rack and pinion mechanism.

What is claimed is:

1. A servo-system for positioning a movable member in accordance with an input signal comprising a variable reactance including a pair of relatively movable elements for varying the reactance in accordance with their relative displacement, means for varying said displacement in dependence upon said input signal and the position of said movable member, an electron discharge oscillatory circuit, said reactance being coupled to the oscillatory circuit and controlling the amplitude of oscillation thereof in accordance with said relative displacement, rectifier means having its input coupled to said oscillatory circuit and providing at its output a unidirectional voltage dependent upon said amplitude of oscillation, a direct current motor, a source of current for the motor and a circuit for gradually varying the current from the source through the motor from a maximum in one direction to a maximum in the reverse direction as the amplitude of oscillation changes gradually from substantially zero to maximum, said circuit including a control resistance connected in the output of the rectifier means and means operated by the motor for moving said movable member to cause relative displacement of said elements to restore said reactance to a predetermined value after a change in the input signal.

2. A servo-system according to claim 1, in which the means for varying said displacement includes a movable coil connected to one of the elements and energizable by the input signal for moving said element.

3. A servo-system according to claim 1 in which the control resistance is connected in a current path across the source of current and has a positive temperature coefficient of resistance, the motor being connected between an intermediate potential point of the source of current and an intermediate point of the current path at one end of the control resistance.

4. A servo-system in accordance with claim 3, in which the means for varying said displacement includes a movable coil connected to one of the elements and energizable by the input signal for moving said element, and means coupling the rectifying means to said coil for feeding back changes in the output potential of the rectifier in opposition to the changes in the amplitude of the input signal.

5. A servo-system according to claim 1 in which the movable member is connected to one of the elements of the reactance for causing its displacement, the means for varying the displacement including a movable coil connected to another of the elements of the reactance and energizable by the input signal to cause displacement thereof, and means coupling the signal input terminals of the coil with the rectifier means for feeding back changes in the output potential thereof in opposition to the changes in the amplitude of the input signal.

6. A servo-system according to claim 1 in which the motor includes a rotatable armature, a rotatable disc frictionally driven by the armature shaft and means operatively connecting the disc with the movable member for controlling the relative displacement of the movable elements.

7. A servo-system according to claim 6 including a pivoted arm for supporting the motor and a spring for biasing the motor to maintain frictional engagement of the armature shaft with the periphery of the disc.

8. A servo-system according to claim 7, said arm and motor being mechanically balanced about the axis of the pivot.

9. A servo-system according to claim 1 in which the circuit includes a pair of electron discharge device amplifiers connected across said source of current and each having a load resistance connected at one end to one terminal of the source of current, means for applying the voltage drop across the control resistance to the input of a first of said amplifiers for varying the current through its load resistance in one direction, means coupling the output of the first amplifier to the input of the second amplifier for varying the current through the load resistance of said second amplifier in the opposite direction, the motor being connected between the other ends of the load resistances.

10. A servo-system according to claim 9 wherein the load resistances have a positive coefficient of resistance.

11. A servo-system according to claim 1 in which one of the elements is stationary, the means for varying the displacement including a movable coil connected to the second of the elements and energizable by the input signal for causing the relative displacement of the elements, a source of constant potential, a potential divider connected across the source of constant potential and including a slider for deriving a voltage, means for applying said voltage in series with the signal to said movable coil, the movable member being connected to the slider for deriving a voltage of a value equal and opposite to the input signal.

12. A servo-system according to claim 1 in which the output of the rectifier means includes an amplifier connected across said source of current, the control resistance being in the current path of the amplifier.

13. A servo-system according to claim 12 in which the value of the control resistance varies in accordance with the amplitude of current therethrough, the armature of the motor being connected between the end of the control resistance which is at an intermediate point in the amplifier current path and an intermediate potential point of the source of current.

14. A servo-system according to claim 2, and including means coupling the rectifier means to said coil for feeding back changes in the output potential of the rectifier means in opposition to the changes in the amplitude of the input signal.

15. A servo-system according to claim 3, in which one of the elements is stationary, the means for varying the displacement including a movable coil connected to the second of the elements and energizable by the input signal for causing the relative displacement of the elements, a source of constant potential, a potential divider connected across the source of constant potential and including a slider for deriving a voltage, means for applying said voltage in series with the signal to said movable coil, the movable member being connected to the slider for deriving a voltage of a value equal and opposite to the input signal.

16. A servo-system according to claim 15, including means coupling the rectifier means to said coil for feeding back changes in the output potential of the rectifier means in opposition to the changes in the amplitude of the input signal.

17. A servo-system according to claim 3, in which the movable member is connected to one of the elements of the reactance for causing its displacement, the means for varying the displacement including a movable coil connected to another of the elements of the reactance and energizable by the input signal to cause displacement thereof.

18. A servo-system according to claim 17, and including means coupling the rectifier means to said coil for feeding back changes in the output potential of the rectifier means in opposition to the changes in the amplitude of the input signal.

19. A servo-system according to claim 9, in which the means for varying said displacement includes a movable coil connected to one of the elements and energizable by the input signal for moving said element, and means coupling the rectifying means to said coil for feeding back changes in the output potential of the rectifier in opposition to the changes in the amplitude of the input signal.

20. A servo-system according to claim 9, in which one of the elements is stationary, the means for varying the displacement including a movable coil connected to the second of the elements and energizable by the input signal for causing the relative displacement of the elements, a source of constant potential, a potential divider connected across the source of constant potential and including a slider for deriving a voltage, means for applying said voltage in series with the signal to said movable coil, the movable member being connected to the slider for deriving a voltage of a value equal and opposite to the input signal.

21. A servo-system according to claim 20, and including means coupling the rectifier means to said coil for feeding back changes in the output potential of the rectifier means in opposition to the changes in the amplitude of the input signal.

22. A servo-system according to claim 9, in which the movable member is connected to one of the elements of the reactance for causing its displacement, the means for varying the displacement including a movable coil connected to another of the elements of the reactance and energizable by the input signal to cause displacement thereof.

23. A servo-system according to claim 22, and including means coupling the rectifier means to said coil for feeding back changes in the output potential of the rectifier means in opposition to the changes in the amplitude of the input signal.

References Cited in the file of this patent

UNITED STATES PATENTS

| | | |
|---|---|---|
| 2,885,611 | MacGeorge | May 5, 1959 |
| 2,886,751 | Gilbert | May 12, 1959 |